_United States Patent_ [19]

Donida et al.

[11] Patent Number: 4,892,746

[45] Date of Patent: Jan. 9, 1990

[54] POWDERED SOYBEAM EXTRACT

[76] Inventors: Carlos O. Donida, Rua Engenheiro Ildelfonso Simoes Lopes #40; Isolde H. Degrandi, Rua Panamericana; Raul De Moraes, Rua Joao Abbott #577/8; Nelson Magdalena, Rua Hilario Ribeiro #15/201; Samuel Kreisner, Rua Bage #232/901, all of, Porto Alegre, Brazil

[21] Appl. No.: 256,080

[22] Filed: Oct. 6, 1988

Related U.S. Application Data

[63] Continuation of Ser. No. 1,024, Jan. 7, 1987, abandoned.

[51] Int. Cl.$^4$ .............................................. A23L 1/20
[52] U.S. Cl. .................................... 426/598; 426/431; 426/507
[58] Field of Search ............... 426/598, 431, 656, 507, 426/489

[56] References Cited

U.S. PATENT DOCUMENTS 2,078,962  5/1937  Miller ................................. 426/598
4,194,018  3/1980  Hodel et al. ........................ 426/598

OTHER PUBLICATIONS

Hand et al., "Pilot-Plant Studies on Soymilk", Food Technology, Dec., 1964 (pp. 139–141).

_Primary Examiner_—George Yeung
_Attorney, Agent, or Firm_—John J. Byrne

[57] ABSTRACT

A process is described for producing a water-soluble soybeam extract comprising the steps of hydrating soybeans, crushing the hydrated soybeams at an elevated temperature to form a soybean and water slurry and thereafter thermally treating the slurry. The slurry is then separated into a liquid extract containing portion and a solid portion. If desired, a solid soybean extract powder is recovered by removal of water form the liquid extract containing portion. Also disclosed is a liquid or soluble soybean extract produced by this process which contains a relatively high percentage of protein and a taste similar to cooked cereal.

30 Claims, No Drawings

POWDERED SOYBEAM EXTRACT

This application is a continuation of application Ser. No. 07/001,024, filed Jan. 7, 1987, now abandoned.

BACKGROUND OF THE INVENTION

1. Field of the Invention

This invention relates to an improved process for the production of water-soluble soybean extract. More particularly, this invention relates to a water-soluble soybean extract having a relatively high protein content and superior organoleptic characteristics which is obtained by a process that is relatively simple and efficient.

2. Description of the Background

A basic concept in soybean extraction processes is to recover protein from soybeans in concentrated form. Although other uses for soybean protein concentrates have been disclosed in the prior art, protein concentrates in general are well known for their use as a beverage, e.g., such as a milk substitute or as a component of high protein food products.

A threshold or common denominator of many processes for concentrating soybean protein has been the extraction of these proteins using a variety of solvents. In this regard, many processes disclosed in the prior art have involved organic solvents such as pentane, hexane and/or various alcohols requiring complicated and costly processing equipment and materials.

Similarly, a number of extraction processes known in the prior art utilize water as the soybean protein solvent. However, significant disadvantages are also associated with such processes. For example, such processes have heretofore not overcome significant problems with aroma, flavor and bitterness of the soybean product. In this regard, it is known to produce a soybean extract by the steps of soaking the soybeans followed by milling, extraction in an aqueous phase, separation of the resultant slurry and heating the soluble product. Processes of this kind, however, typically result in a soybean extract having what many consider to be an offensive aroma and taste.

It is also known in the art that the objectionable organoleptic characteristics of soybean extracts can be reduced by crushing the soybeans in the presence of water maintained at an elevated temperature. In this regard, it is believed that the unpleasant taste and aroma associated by many with the soybean concentrates of the prior art are due to the presence of volatile compounds having a relatively low molecular weight. These compounds are produced during the disintegration of the soybean grain with water by the action of the enzyme lipoxidase on unsaturated fatty acid chains. Approximately 80 of these compounds have, thus far, been isolated and roughly half have been identified, the majority of these having unpleasant odors. For example, ethyl-vinylketone, is one of these compounds, the addition of only 5 ppm of which to a water-soluble soybean extract is sufficient for the detection of the characteristic unpleasant taste and aroma of soybeans.

As mentioned previously, the heating of water-soluble soybean extract after the disintegration does not avoid the offensive organoleptic characteristics of the extract. Conversely, heating a soybean product prior to disintegration avoids the unpleasant taste and flavor but results in a relatively low yield of soluble protein concentrate.

The problems suggested in the preceding paragraphs are not intended to be exhaustive, but rather are among many which detract from the effectiveness of prior art processes for producing a water-soluble soybean extract. Other noteworthy problems may also exist. However, those presented hereinabove should suffice to demonstrate that processes for producing soluble soybean extracts appearing in the prior art have no been altogether satisfactory.

Hence, a need still continues to exist for water-soluble soybean extracts devoid of the detrimental characteristics which plague the prior art extracts and a method of preparing thereof.

SUMMARY OF THE INVENTION

In one preferred aspect, the invention provides a process for producing a water-soluble soybean extract comprising hydrating soybeans in water;
removing the hydration water;
crushing the hydrated soybeans in the presence of water at an elevated temperature to form a slurry;
thermally treating the slurry; and
separating a liquid portion containing a soluble soybean extract and a relatively solid insoluble portion from the slurry and recovering the liquid portion.

In another aspect of the present invention, it is provided a process for producing a solid water-soluble soybean extract comprising hydrating soybeans in water;
removing the hydration water;
crushing the hydrated soybeans in the presence of water at an elevated temperature to form a slurry;
thermally treating the slurry;
separating a liquid portion containing a soluble soybean extract and a relatively insoluble solid portion from the slurry;
recovering the liquid portion; and
removing the liquid from the recovered liquid portion to form a solid soluble soybean extract.

In yet another aspect, the present invention comprises a water-soluble soybean extract produced by a process comprising hydrating soybeans in water; removing the hydration water; crushing the hydrated soybeans in the presence of water at an elevated temperature to form a slurry; thermally treating the slurry; and separating a liquid portion containing a soluble soybean extract and a relatively solid insoluble portion from the slurry and recovering the liquid portion.

In still another aspect of the present invention, it is provided a water-soluble soybean extract obtained by hydrating soybeans in water; removing the hydration water; crushing said hydrating soybeans in the presence of water at a elevated temperature to form a slurry; separating a liquid portion containing a soluble soybean extract and a solid portion from said slurry; recovering the liquid portion; and removing the liquid from said separated liquid portion to form a solid soluble soybean extract.

Having generally described the invention, a more complete understanding ca be obtained by reference to the more detailed description of the preferred embodiments, which is provided herein for illustrative purposes only and is not intended to be limiting unless otherwise specified.

DESCRIPTION OF THE PREFERRED EMBODIMENTS

The present invention arose from the desire of finding a water-soluble soybean extract which does not exhibit the taste and aroma commonly associated with prior art extracts. Thus, the extract of this invention is produced by hydrating hulled or dehulled soybeans in water, removing the hydration water, crushing in the presence of hot water and subsequently thermally treating the crushed materials to inactivate non-nutritional components. A solid soybean extract product in powder form may then be obtained through the separation of the insoluble fraction, e.g., by centrifugation with the soluble fraction undergoing concentration and spray-drying to attain a powdered extract.

Any known variety of soybean can be utilized as the starting material to produce the extract of the present invention. For example, typical varieties of soybeans include the Hark, Wayne, Amsoy, Corsoy, Clark, Bragg, Santarosa, Vicosa, IAC-1, IAC-2, IAC-3, Prata, Davis, Hard and Hood varieties.

In accordance with this invention, the soybean product should be freed from toxic products and cleaned by conventional means to eliminate undesirable materials such as broken grains, stones, husks and dust. Preferably, the soybeans are dried under a temperature of between about 60° C. and 85° C., and then cooled and stored at room temperature in appropriate store houses or elevators prior to processing. Also, preferably, the storage humidity should be lower than about 13% to maintain a high protein dispersive index (PDI) necessary to attain a product with high nutritional value and good extractability. After storage, a final cleaning classification is preferably done through conventional means in order to eliminate the remaining undesirable materials and to complete the removal of dust and mud.

The initial step in the process for producing the extract of the present invention is the hydration of the soybeans. This hydration step may be accomplished, e.g., by mixing the soybeans with ordinary tap water. The soybeans may be in either a hulled or dehulled state and are preferably hydrated at a temperature of between about 20° C. and 50° C. for a period of from about 2 hours to 12 hours at a proportion of about 3 to 5 liters of water per each kilo of soybeans. The combination of the time, temperature and solid-liquid proportion determines the degree of hydration. The degree of hydration can be measured by the observable weight changes of the soybean. Optimally, the soybeans are hydrated to about 2 to 3 times their original weight.

As mentioned previously the soybeans can be hydrated in either a hulled or dehulled state. In either case, however, it is preferable that the soybean cotyledons remain intact during the hydration period. After the hydration, water is removed and fresh water is added. The hydrated soybean product is then crushed by any conventional milling or grinding means such as a hammer mill which readily breaks up the beans to form a slurry. It is important, however, that the crushing of the soybeans occur in the presence of water and at a temperature of at least about 80° C. in order to inactivate the lipoxidase enzyme and prevent the final product from acquiring a bitter taste of raw soybeans. Depending on the initial degree of hydration and the particular soybean product, the temperature of the soybean slurry should rang from between about 80° C. to 90° C. Sufficient water should be present to obtain a slurry having a solids content of from about 7% to 18%.

To obtain an extract product with a relatively high nutritional value, the slurry is then thermally treated to eliminate non-nutritional components such as anti-trypsin, hemagglutinin and goitrogenic factors. These compounds are reduced to desirable levels by maintaining the temperature of the slurry at from at least about 90° C. to 120° C. for a time of from about 3 to 30 minutes. Preferably, the temperature is maintained during this period at between about 100° C. and 105° C. The thermal treatment can be accomplished, for example, by direct or indirect steam addition by conventional means.

Upon completion of the thermal treatment, a liquid extract product is recovered by means of solid-liquid separation, e.g., centrifugation of the slurry. Under the action of a centrifugal force, solid parts with higher specific weight are separated from the remaining liquid fraction containing the soluble extract. This liquid which flows out from the centrifuge has a pleasant taste and coloring and a texture similar to cow's milk. The average total solids content of the liquid will optimally range from about 6% to 11%.

The liquid soybean extract may be utilized in this form or may be further concentrated to obtain a solid powdered water-soluble extract product. Conversion of the extract to solid powdered form is preferably done by concentrating the liquid extract through evaporation and then drying the concentrated product in a spray drier. During the evaporation step, the liquid extract is maintained under relatively low pressure of from about 50 to 220 mm Hg and at a temperature of between about 30° C. and 75° C. Multiple stage evaporators which are well known in the art may be utilized to effect the required concentration. The temperature and pressure are selected to avoid protein denaturization which can diminish protein solubility.

In the evaporation process, aromatic compounds with low molecular weights such as aldehydes and ketones are also eliminated, which is of additional benefit as these compounds may contribute unpleasant flavors and aromas to the powdered extract. Thus, during the evaporation stage, in addition to the reduction of the water content, product deodorization is also accomplished without affecting the nutritional compounds. This also contributes to the organoleptic quality of the final product. The concentrated extract obtained at this stage preferably has a solids content of between about 15% and 30% depending upon the degree of viscosity and operating conditions of the evaporation equipment.

To permit the storage of the solid powdered product for substantial time periods, it is necessary to eliminate substantially all of the water in the product. This is preferably accomplished by a spray drying operation well known to those skilled in the art. For example, the product may be introduced to a drying chamber where it is atomized with hot air at a temperature of between about 170° C. and 230° C. to evaporate the water contained in the extract. The relatively short time period that the extract is in the compartment and the fast evaporation of the water permits that the product attain a high temperature level without protein denaturation. The powdered product can then be transported out the chamber, cooled and packaged.

In describing a water-soluble soybean extract in accordance with the preferred embodiment of the invention, those skilled in the art will recognize several advantages which singularly distinguish the subject invention from the heretofore known prior art. A particular advantage of the process of the subject invention is that the process is relatively simple and avoids the storage, handling and disposal of organic compounds such as pentane and hexane, unlike many of the processes of the prior art.

Another significant advantage of the subject invention is the production and recovery of a water-soluble soybean extract having superior organoleptic characteristics. In sharp contrast, many of the processes of the prior art have produced a soybean extract product having an unpleasant taste and aroma which are unattractive to many consumers. The present invention, however, produces an extract product having pleasant taste and coloring, and a texture which is similar to that of cow's milk.

The following examples are intented to illustrate specific embodiments of the invention and should not be considered to impose any limitations on the invention.

EXAMPLES

EXAMPLE 1

40 kilos of soybeans of the Davis variety were washed and hydrated with 160 liters of water at room temperature for 6 hours. The water used for hydration was drained and substituted with an equivalent volume of fresh water.

The soybeans were then crushed with the addition of 240 liters of water at 90° C. and with the injection of direct steam in the mill during the crushing, to maintain the temperature of the crushed material above 80° C.

Immediately after exiting the mill, this material was heated in continuous flow with the injection of direct steam until the temperature of the material attained 100° C. for 5 minutes. Then the insoluble fraction was separated and the resulting extract was concentrated to a 25% total solids content and then dried in a spray-drier. the resulting extract was concentrated to a 25% total solids content and then dried in a spray-drier.

EXAMPLE 2

For comparison purposes, another experiment was done with the same weight of soybeans, but without the hydration step.

The soybean was washed and then crushed with the addition of 400 liters of water at 90° C., maintaining the same total soybean-water relationship as in Example 1, i.e., 1:10. The operations of thermal treatment, centrifugation, concentration and drying were the same as in Example 1.

In both experiments, the yield of total solids, protein and fat was measured with the results contained in Table 1.

TABLE 1

| Results of Experiments 1 and 2 | | |
|---|---|---|
| | Example 1 | Example 2 |
| Total solids | 63.5%* | 59.0% |
| Protein | 71.0% | 61.8% |
| Fat | 74.4% | 68.8% |

*basis: dried soybean

In the production of water-soluble soybean extract higher yields are obtained when the hydration operation is done. The powdered extracts were evaluated by 12 trained tasters who expressed a definite preference for the soybean extract of Example 1. The flavor was described as neutral, bland and pleasant and similar to cooked cereals. The extract obtained from Example 2 showed a slightly darker color and the flavor was described as somewhat bitter.

EXAMPLE 3

The yield of water-soluble soybean extract obtained from 100 kg of hulled soybeans and the yield of 100 kg of soybeans of the same variety which had been dehulled was compared.

The extraction conditions used in the two experiments were the same as in Example 1 with all losses in the process until the crushing stage being computed as described in Table 2 below.

TABLE 2

| Comparison of process with and without dehulling | | |
|---|---|---|
| Losses | With dehulling (kg) | Without dehulling (kg) |
| Weight of hulled soybeans | 100.0 | 100.0 |
| Washing | — | 1.0 |
| Loss from dehulling | 6.5 | — |
| Hydration | 2.6 | 1.0 |
| Total losses | 9.1 | 2.0 |
| Soybean for crushing | 90.9 | 98.0 |
| Extraction - total solids | 50.7 | 60.0 |

The yield of water-soluble soybean extract in powder is higher when dehulling is not done in the process.

The two extracts were evaluated by tasters as in Example 1, who expressed a definite preference for the extract obtained from the hulled soybean. This may occur because of the higher enzymatic activity in the dehulled soybean during the hydration operation with the consequent formation of compounds with unpleasant taste and aroma.

EXAMPLE 4

40 kg of soybean of the Davis variety were washed and hydrated as described in Example 1. Crushing was done with the addition of 240 liters of cold water, followed by heating the crushed material up to 100° C. with the injection of direct steam, and the material was kept at this temperature for 5 minutes. The operations of separation of insoluble materials, concentration and drying were the same as in Example 1.

The water-soluble soybean extract obtained by this process was compared with the results of Example 1. The extraction yield (total solids) for this experiment was 65% and thus higher than the yield obtained when the crushing was done with water at 90° C., which according to Experiment 1 was 63.5%.

The two extracts were reconstituted with water to the level of 8% of total solids and were then evaluated by the tasters team, as in Examples 1 and 2. The acceptance and preference was given by 100% of the tasters to the extract from Example 1. The extract obtained by crushing with cold water was classified as having "bitter taste" and "raw bean taste", and therefore, not acceptable.

EXAMPLE 5

40 kg of soybeans of the Davis variety were washed and hydrated according to Example 1. After removal of the water from the hydration step, 240 liters at 90° C. were added. The soybeans were then cooked for 30 minutes at 96° C. An equivalent volume of water to that which evaporated during cooking was then added back. The same volume of the cooked soybeans was then crushed with the cooked water, with the remaining steps in the production of the water-soluble soybean extract done as in Example 1 with the exception that no thermal treatment was performed subsequent to the crushing operation.

The yield of this experiment and the water-soluble soybean extract in powder obtained were compared to the results of Example 1.

The extraction yield (total solids) of this process was 36% which represents about 57% of the extraction yield obtained in Example 1. This soybean extract when reconstituted in water a the level of 8% of total solids and evaluated by the tasters team did not show significant differences of acceptance and preference when compared to the extract obtained in Example 1.

EXAMPLE 6

40 kg of soybeans of the Davis variety were washed, hydrated and crushed as described in Experiment 1 of Example 1, i.e., hydrated with 160 liters of water at room temperature for 6 hours, drained, replaced with 160 l of water and crushed with the addition of 240 liters of water at 90° C. and with the injection of direct steam in the mill during crushing, to maintain the temperature of the crushed material above 80° C. After grinding, the material was filtered and the liquid extract was kept at boiling point for 30 minutes.

This extract was then compared with the one obtained according to the procedure of Experiment 1, Example 1, conducted without the steps of concentration and drying.

The extract of Experiment 1, Example 1, presented an urease activity 50% lower than the extract of this experiment.

A taster's panel indicated a definite preference towards the extract of Experiment 1, finding that the extract of this experiment had a slightly darker color, stronger beany odor and somewhat of a bitter taste.

Still another advantage of the present invention is the relatively high nutritional value of the extract product. Unlike processes of the prior art which sought to recover extract products of suitable taste and aroma, the subject invention has a high nutritional content and relatively low amounts of non-nutritional components.

In describing the invention, reference has been made to preferred embodiments. Those skilled in the art, and familiar with the disclosure of the subject invention, may however, recognize additions, deletions, substitutions, modifications and/or other changes which will fall within the purview of the invention as defined in the following claims.

What is claimed is:

1. A process for producing a liquid water-soluble and soybean extract, comprising:
   hydrating soybeans in a first water bath to obtain hydrated soybeans;
   replacing said first water bath with a second water bath;
   crushing dehydrated soybeans in the presence of an additional third water bath at a temperature between about 80° C. to 90° C. to form a slurry;
   thermally treating the slurry;
   separating a liquid portion containing a water-soluble soybean extract and a relatively solid insoluble portion from the slurry; and
   recovering said liquid portion.

2. The process of claim 1 further comprising dehulling the soybeans prior to hydration.

3. The process of claim 1 further comprising dehulling the soybeans subsequent to hydration.

4. The process of claim 1 wherein the soybeans are hydrated at a temperature of from about 20° C. to 50° C.

5. The process of claim 1 wherein the soybeans are hydrated for a period of from about 2 to about 12 hours.

6. The process of claim 1 wherein the soybeans are hydrated by adding water to said soybeans in an amount of from about 3 liters to 5 liters of water per kilogram of soybeans.

7. The process of claim 1 wherein the slurry contains from about 7% to 18% solids.

8. The process of claim 1 wherein the slurry is thermally treated at a temperature of 85° C. for about 30 minutes.

9. The process of claim 1 wherein the slurry is thermally treated at a temperature of about 125° C. for about 3 minutes.

10. A process for producing a solid water-soluble soybean extract, comprising:
    hydrating soybeans in a first water bath to obtain hydrated soybeans;
    replacing said first water bath with a second water bath;
    crushing the hydrated soybeans in the presence of an additional third water bath at a temperature between about 80° C. to 90° C. to form a slurry;
    thermally treating the slurry;
    separating a liquid portion containing a soluble soybean extract and relatively insoluble solid portion from the slurry; and
    removing the liquid from said separated liquid portion to form the solid water-soluble soybean extract.

11. The process of claim 10 comprising dehulling the soybeans prior to hydration.

12. The process of claim 10 further comprising dehulling the soybeans subsequent to hydration.

13. The process of claim 10 wherein the soybeans are hydrated at a temperature of from about 20° C. to 50° C.

14. The process of claim 10 wherein the soybeans are hydrated for a period of from about 2 to about 12 hours.

15. The process of claim 10 wherein the soybeans are hydrated by adding water to said soybeans in an amount of from about 3 liters to 5 liters of water per kilogram of soybeans.

16. The process of claim 10 wherein the slurry contains from about 7% to 18% solids.

17. The process of claim 10 wherein the slurry is thermally treated at a temperature of from about 85° C. to 125° C.

18. The process of claim 10 wherein the slurry is thermally treated for a period of from about 3 minutes to 30 minutes.

19. The process of claim 11 wherein the liquid portion containing a soluble soybean extract is separated from said solid portion by centrifugation.

20. The process of claim 10 wherein the liquid portion containing a soluble soybean extract comprises about 6% to 11% solids.

21. The process of claim 10 wherein the liquid is removed from said liquid portion containing a soluble soybean extract by
    concentrating said soluble soybean extract in said liquid portion through evaporation of a portion of the liquid, and
    drying the extract to remove substantially all of the remaining liquid.

22. The process of claim 9 wherein the extract is concentrated in said liquid portion at a temperature of between about 35° C. and 70° C. and a pressure of from about 50 to 220 mm Hg.

23. The process of claim 9 wherein the extract is concentrated by evaporation to a solids content of from about 15% to 30%.

24. The process of claim 23 wherein the concentrated extract is dried by spray drying at a temperature of from about 170° C. to 230° C. to produce an extract powder.

25. The process of claim 18 wherein the extract is concentrated in said liquid portion at a temperature of between about 35° C. and 70° C. and a pressure of from about 50 to 220 mm Hg.

26. The process of claim 18 wherein the extract is concentrated by evaporation to a solids content of from about 15% to 30%.

27. The process of claim 26 wherein the concentrated extract is dried by spray drying at a temperature of from about 170° C. to 230° C. to produce an extract powder.

28. A liquid water-soluble soybean extract produced by the process of claim 1.

29. A solid water-soluble soybean extract produced by the of claim 12.

30. A process for producing a liquid water soluble soybean extract, consisting of the steps of:
 hydrating soybeans in a first water bath to obtain hydrated soybeans in water;
 replacing said first water bath with a second water bath;
 crushing with hydrated soybeans in the presence of an additional third water bath at a temperature of between about 80° C. to 90° C. to form a slurry;
 thermally treating the slurry at a temperature between about 100° C. and 105° C.;
 separating a liquid portion containing a water soluble soybean extract and a relatively solid insoluble portion from the slurry; and
 recovering said liquid portion.

* * * * *